(12) United States Patent
Xin et al.

(10) Patent No.: US 12,155,515 B2
(45) Date of Patent: Nov. 26, 2024

(54) TRANSMISSION BANDS FOR DIFFERENT NUMEROLOGIES

(71) Applicant: ZTE Corporation, Guangdong (CN)

(72) Inventors: Yu Xin, Guangdong (CN); Tong Bao, Guangdong (CN); Jin Xu, Guangdong (CN); Guanghui Yu, Guangdong (CN); Liujun Hu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 363 days.

(21) Appl. No.: 17/864,254

(22) Filed: Jul. 13, 2022

(65) Prior Publication Data
US 2022/0353127 A1    Nov. 3, 2022

Related U.S. Application Data

(63) Continuation of application No. PCT/CN2020/072741, filed on Jan. 17, 2020.

(51) Int. Cl.
*H04L 27/26* (2006.01)
*H04L 1/00* (2006.01)

(52) U.S. Cl.
CPC ...... *H04L 27/26025* (2021.01); *H04L 1/0003* (2013.01); *H04L 27/2607* (2013.01)

(58) Field of Classification Search
CPC ............... H04L 1/0003; H04L 27/2607; H04L 27/26025
See application file for complete search history.

(56) References Cited

U.S. PATENT DOCUMENTS 9,820,281 B1    11/2017  Werner et al.
10,038,581 B2    7/2018  Zhang et al.
(Continued)

FOREIGN PATENT DOCUMENTS

CN    107483166 A    12/2017
CN    108029096 A    5/2018
(Continued)

OTHER PUBLICATIONS

European Search Report for EP Patent Application No. 20888693.7, dated Dec. 23, 2022, 8 pages.
(Continued)

*Primary Examiner* — Alpus Hsu
*Assistant Examiner* — Camquyen Thai
(74) *Attorney, Agent, or Firm* — Perkins Coie LLP

(57) ABSTRACT

Methods, apparatus, and systems for increasing spectral efficiency for transmissions with different numerologies. In one example aspect, a wireless communication method. The method includes operating, by a communication device, a first transmission band associated with a first numerology. The first transmission band comprises a first subcarrier spacing $\Delta f1$ and a first symbol length of T1 in time domain. The method includes operating, by the communication device, a second transmission band associated with a second numerology. The second transmission band comprises a second subcarrier spacing $\Delta f2$. The method also includes operating, by the communication device, a third transmission band positioned between the first transmission band and the second transmission band. The third transmission band comprises a subcarrier spacing equal to the second subcarrier spacing $\Delta f2$ and a symbol length equal to the first symbol length T1.

20 Claims, 8 Drawing Sheets

(56) References Cited

U.S. PATENT DOCUMENTS

| | | |
|---|---|---|
| 10,200,994 B2 | 2/2019 | Park et al. |
| 10,419,171 B2 | 9/2019 | Park et al. |
| 10,721,049 B2 | 7/2020 | Cui |
| 10,992,409 B2* | 4/2021 | Hao .................. H04W 72/044 |
| 2007/0155387 A1* | 7/2007 | Li ........................ H04L 1/0007 |
| | | 375/141 |
| 2010/0178057 A1* | 7/2010 | Shieh ................. H04L 25/0242 |
| | | 398/79 |
| 2015/0098364 A1 | 4/2015 | Hassan et al. |
| 2017/0339697 A1 | 11/2017 | Park et al. |
| 2018/0007673 A1* | 1/2018 | Fwu ..................... H04W 72/12 |
| 2018/0048436 A1 | 2/2018 | Park et al. |
| 2018/0070192 A1 | 3/2018 | Lee et al. |
| 2018/0131493 A1* | 5/2018 | Luo ....................... H04L 5/0007 |
| 2019/0090225 A1* | 3/2019 | Tang ..................... H04W 48/12 |
| 2019/0207697 A1* | 7/2019 | Ghasemzadeh ........ H04J 11/003 |
| 2019/0268198 A1 | 8/2019 | Oketani |
| 2019/0357239 A1 | 11/2019 | Moon et al. |
| 2019/0372815 A1 | 12/2019 | Suh et al. |
| 2020/0106575 A1* | 4/2020 | Masal .................. H04L 5/0044 |

FOREIGN PATENT DOCUMENTS

| | | |
|---|---|---|
| CN | 108737306 A | 11/2018 |
| CN | 109155722 A | 1/2019 |
| CN | 109302718 A | 2/2019 |
| CN | 110278063 A | 9/2019 |
| EP | 3497982 A1 | 6/2019 |
| WO | 2018031236 A1 | 2/2018 |

OTHER PUBLICATIONS

International Search Report and Written Opinion for International Application No. PCT/CN2020/072741, mailed on Oct. 13, 2020 (8 pages).

Korean office action issued in KR Patent Application No. 10-2022-7028273, dated Jun. 19, 2024, 8 pages. English translation included.

Chinese office action issued in CN Patent Application No. 202080091957.5, dated Jul. 21, 2023, 13 pages. English translation included.

Chinese office action issued in CN Patent Application No. 202080091957.5, dated Dec. 14, 2023, 9 pages. English translation included.

Chinese Notification to Complete Formalities of Registration issued in CN Patent Application No. 202080091957.5, dated Mar. 15, 2024, 8 pages. English translation included.

* cited by examiner

TRANSMISSION BANDS FOR DIFFERENT NUMEROLOGIES

CROSS-REFERENCE TO RELATED APPLICATIONS

This application is a continuation of International Patent Application No. PCT/CN2020/072741, filed on Jan. 17, 2020, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that provide a special transmission band or sub-band located between two adjacent transmission bands or sub-bands with different numerologies to leverage the spectrum between the adjacent transmission bands so that orthogonality can be maintained between subcarriers of all adjacent transmission bands, thereby minimizing interference and providing good spectral efficiency.

In one example aspect, a wireless communication method. The method includes operating, by a communication device, a first transmission band associated with a first numerology. The first transmission band comprises a first subcarrier spacing $\Delta f1$ and a first symbol length of T1 in time domain. The method includes operating, by the communication device, a second transmission band associated with a second numerology. The second transmission band comprises a second subcarrier spacing $\Delta f2$, where $\Delta f2 = N \times \Delta f1$ and N is a positive integer greater than 1. The method also includes operating, by the communication device, a third transmission band positioned between the first transmission band and the second transmission band. The third transmission band comprises a subcarrier spacing equal to the second subcarrier spacing $\Delta f2$ and a symbol length equal to the first symbol length T1.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The 5G New Radio (NR) communication systems use Cyclic-Prefix Orthogonal Frequency Division Multiplexing (CP-OFDM) as the basic waveform. Also, two adjacent transmission bands or sub-bands can use different numerologies. That is, subcarrier spacing is no longer fixed. Flexible numerology in 5G enables a lot of flexibility. However, it also introduces new challenges with the way waveforms are built and managed. In particular, the use of different numerologies by adjacent transmission bands destroys the orthogonality between the subcarriers, causing interference problems.

To address the interference problems, one conventional method is to insert a guard band between the adjacent transmission bands with different numerologies. However, large guard bands for different numerologies become a waste of frequency resources. Other conventional methods suppress out-of-band leakage based on windowing and/or filtering, but these methods have limited effects in reducing interference between transmission bands that are sub-bands. Therefore, there remains a need for a transmission mechanism that not only reduces the interference between transmission bands and/or sub-bands but also provides good spectral efficiency.

Some techniques disclosed herein provide a special transmission band or sub-band that is located between two adjacent transmission bands or sub-bands with different numerologies. The special transmission band is designed to leverage the spectrum of guard band(s) in such a way that orthogonality can be maintained between subcarriers of all adjacent transmission bands, thereby minimizing interference and providing good spectral efficiency. The special transmission band can be suitable for Machine-To-Machine transmissions and/or Narrow Band Internet of Things (NB-IoT) transmissions.

Figure 1:
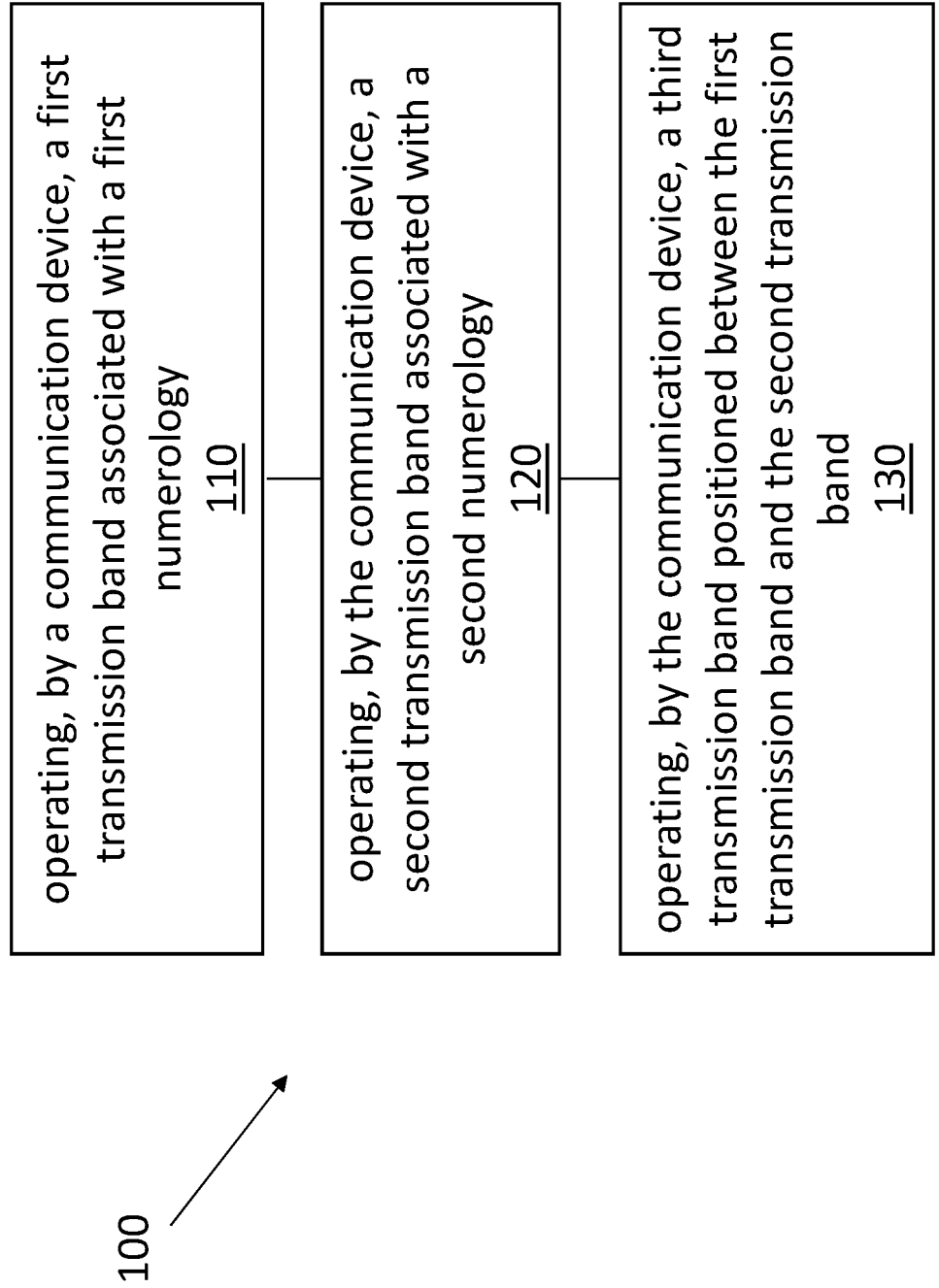
FIG. 1 is a flowchart representation of a wireless communication method in accordance with the present technology.

FIG. 1 is a flowchart representation of an example method 100 for wireless communication in accordance with the present technology. The method 100 includes operating (110), by a communication device, a first transmission band associated with a first numerology. The first transmission band comprises a first subcarrier spacing Δf1 and a first symbol length of $T_1$ in time domain. In some cases, the symbol length refers to a time-domain length that includes cyclic prefix (CP). For example, $T_1=1/\Delta f1+T_{cp}=T_i$, where $T_{cp}$ is the length of CP and $T_i$ is the spacing between start positions of two adjacent symbols. $T_i$ can also be referred to as a symbol interval. In some cases, the symbol length refers to an effective symbol length that excludes CP. For example, when a symbol includes CP, $T_1=1/\Delta f1=T_i-T_{cp}$, where $T_i$ is the symbol interval and $T_{cp}$ is the length of CP. When a symbol does not include CP, $T_1=1/\Delta f1=T_i$, where $T_i$ is the symbol interval. The method 100 includes operating (120), by the communication device, a second transmission band associated with a second numerology. The second transmission band comprises a second subcarrier spacing Δf2. Here, Δf2=N×Δf1 and N is a positive integer greater than 1. The method also includes operating (130), by the communication device, a third transmission band positioned between the first transmission band and the second transmission band. The third transmission band comprises a subcarrier spacing equal to the second subcarrier spacing Δf2 and a symbol length equal to the symbol length $T_1$. Here, a transmission band can be a band or a sub-band. In some embodiments, operating a transmission band includes transmitting and/or receiving data based on signal transmissions occupying the transmission band.

In some embodiments, the communication device is a base station. In some embodiments, the communication device is a user device. In some embodiments, operating the first transmission band, operating the second transmission band, and operating the third transmission band are performed simultaneously. In some embodiments, the first, second, and third transmission bands are sub-bands of a channel bandwidth.

In some embodiments, the symbol length is equal to a time-domain spacing between start positions of two adjacent symbols. In some embodiments, the symbol length includes a cyclic prefix having a length of Tcp, and T1=1/Δf1+Tcp. In some embodiments, the symbol length is an effective symbol length excluding a cyclic prefix, and T1=1/Δf1.

In some embodiments, the symbol length of the third transmission band includes N duplicated data sequences. Duplication of the symbols can reduce the impact of signal interference and improve demodulation performance. In some embodiments, an interval between a boundary subcarrier of the third transmission band and a subcarrier of the first transmission band is L×Δf1, L being positive integers. In some embodiments, an interval between a boundary subcarrier of the third transmission band and a subcarrier of the second transmission band is M×Δf2, M being positive integers.

In some embodiments, the first transmission band is associated with a first modulation and coding scheme (MCS), the second transmission band is associated with a second MCS, and third transmission band is associated with a third MCS. The first and/or second MCS are selected from a first set of MCSs (e.g., a first table of MCSs), and the third modulation and coding scheme is selected from a second set of MCSs (e.g., a second table of MCSs). A largest modulation order in second set of MCSs is equal to or smaller than a largest modulation order in the first set of MCSs. In some embodiments, a modulation order of the first transmission band is equal to or greater than a modulation order of the third transmission band. In some embodiments, a modulation order of the second transmission band is equal to or greater than a modulation order of the third transmission band. That is, the third transmission band uses an MCS having a lower modulation order, thereby reducing the impact of signal interference and improving demodulation performance.

As further described in the present document, the above-described methods provide a special transmission band between two adjacent transmission bands with different numerologies. The special transmission band is designed to ensure that subcarriers of the special transmission band and the two adjacent transmission bands are orthogonal, thereby reducing interference among the bands or sub-bands. The use of such special transmission bands also minimizes the waste of frequency resources, thereby providing good spectral efficiency. Some examples of the disclosed techniques are described in the following example embodiments.

Embodiment 1

Figure 2:
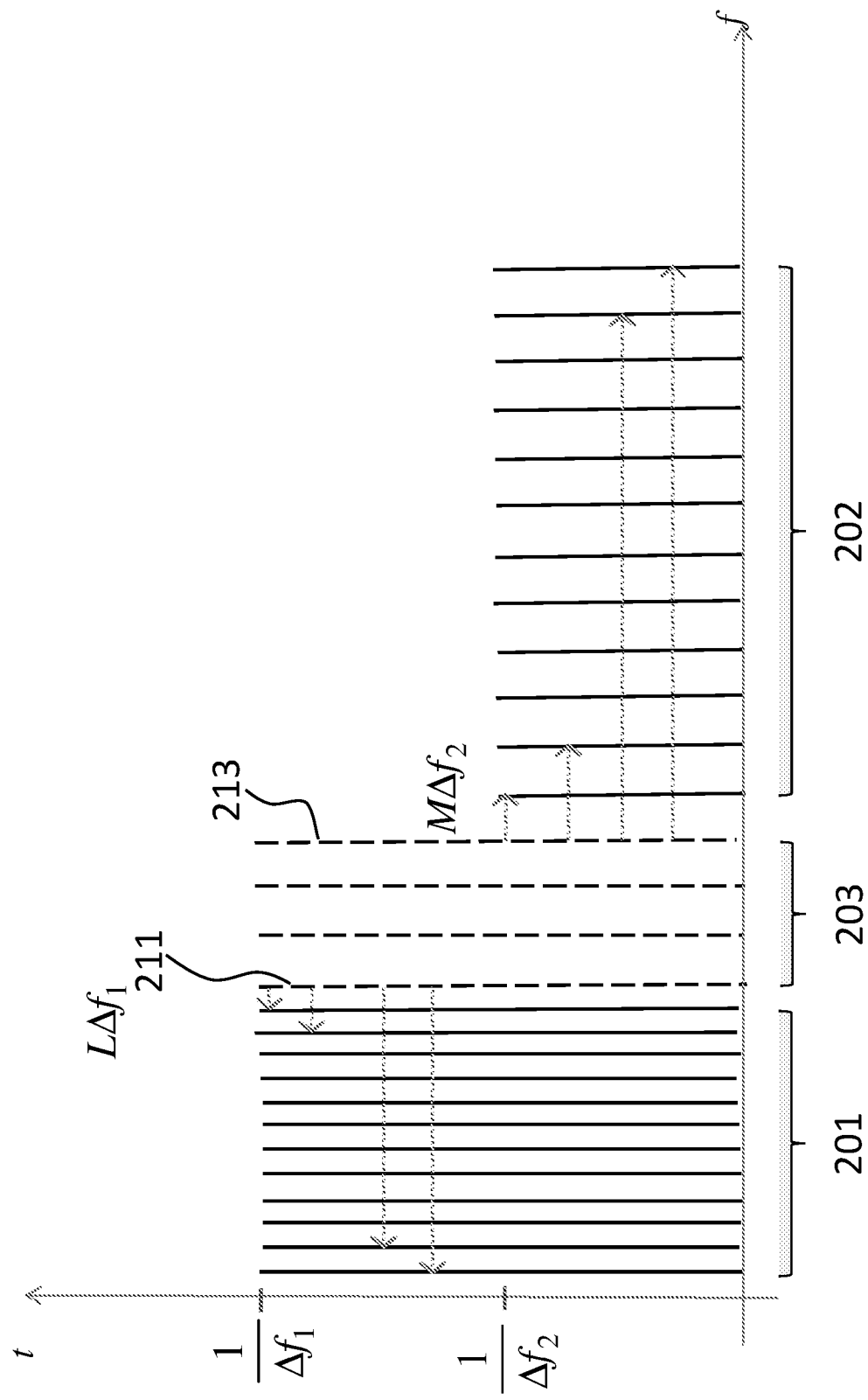
FIG. 2 illustrates an example of transmission bands in accordance with the present technology.

FIG. 2 illustrates an example of transmission bands in accordance with the present technology. In FIG. 2, a special transmission band Band3 (203) is located between two adjacent bands (or sub-bands) Band1 (201) and Band2 (202). Band1 and Band2 have different numerologies. The subcarrier spacing of Band1 (201) is $\Delta f_1$ and an effective symbol length of Band1 is $1/\Delta f_1$. The subcarrier spacing of Band2 (202) is $\Delta f_2$ and an effective symbol length of Band2 is $1/\Delta f_2$. In some embodiments, $\Delta f_2=N\Delta f_1$ is satisfied, and N is a positive integer. In some embodiments, N>1.

The subcarrier spacing of Band3 (203) is $\Delta f_2$ (same as the subcarrier spacing of Band2) while the symbol length of Band3 is same as the symbol length of Band1. In this case, the symbol length refers to the effective symbol length of each band. That is, the effective lengths of Band1 and Band3 are both $1/\Delta f_1$. Setting the subcarrier spacing of Band3 to $\Delta f_2$ provides the advantage that subcarriers of Band3 and subcarriers of Band2 can remain orthogonal to each other. Similarly, setting the symbol length of Band3 to the symbol length of Band 1 can allow subcarriers of Band3 and subcarriers of Band1 to remain orthogonal to each other. Even when the symbol length includes CP, the interference caused by non-orthogonality of the subcarriers remains low.

In this embodiment, Band3 (203) occupies the entire spectrum between Band1 (201) and Band2 (202). The distance between the leftmost subcarrier 211 of Band3 and the subcarriers of Band1 (from right to left) is $L\Delta f_1$, where L is a positive integer. The distance between the rightmost subcarrier 213 of Band3 and the subcarriers of Band2 (from left to right) is $M\Delta f_2$, where M is a positive integer. This way, subcarriers of Band3 can remain orthogonal with subcarriers of Band1 and Band2.

For example, as shown in FIG. 2, Band1 can have 12 subcarriers in a resource block (RB). The subcarrier spacing of Band1 $\Delta f_1$ is 15 kHz. The symbol length of Band1 is $1/\Delta f_1=1/15$ kHz. Band2 also has 12 subcarriers in an RB. The subcarrier spacing of Band2 $\Delta f_2=2\Delta f_1=30$ kHz (that is, N=2). N can be other integer values as well. The special transmission band Band3 has 4 subcarriers. It is also noted that the transmission bands (e.g., Band1, Band2, and/or Band3) can include more subcarriers and/or multiple RBs. The special transmission band is configured so that its subcarrier spacing is $\Delta f_2=30$ kHz and the symbol length is $1/\Delta f_1=1/15$ kHz.

In this specific example, the distance between the leftmost subcarrier of Band3 and the subcarriers of Band1 (from right to left) is $L\Delta f_1$, where $L=1, 2, \ldots, 12$. The distance between the rightmost subcarrier of Band3 and the subcarriers of Band2 (from left to right) is $M\Delta f_2$, where $M=1, 2, \ldots, 12$.

Embodiment 2

Figure 3:
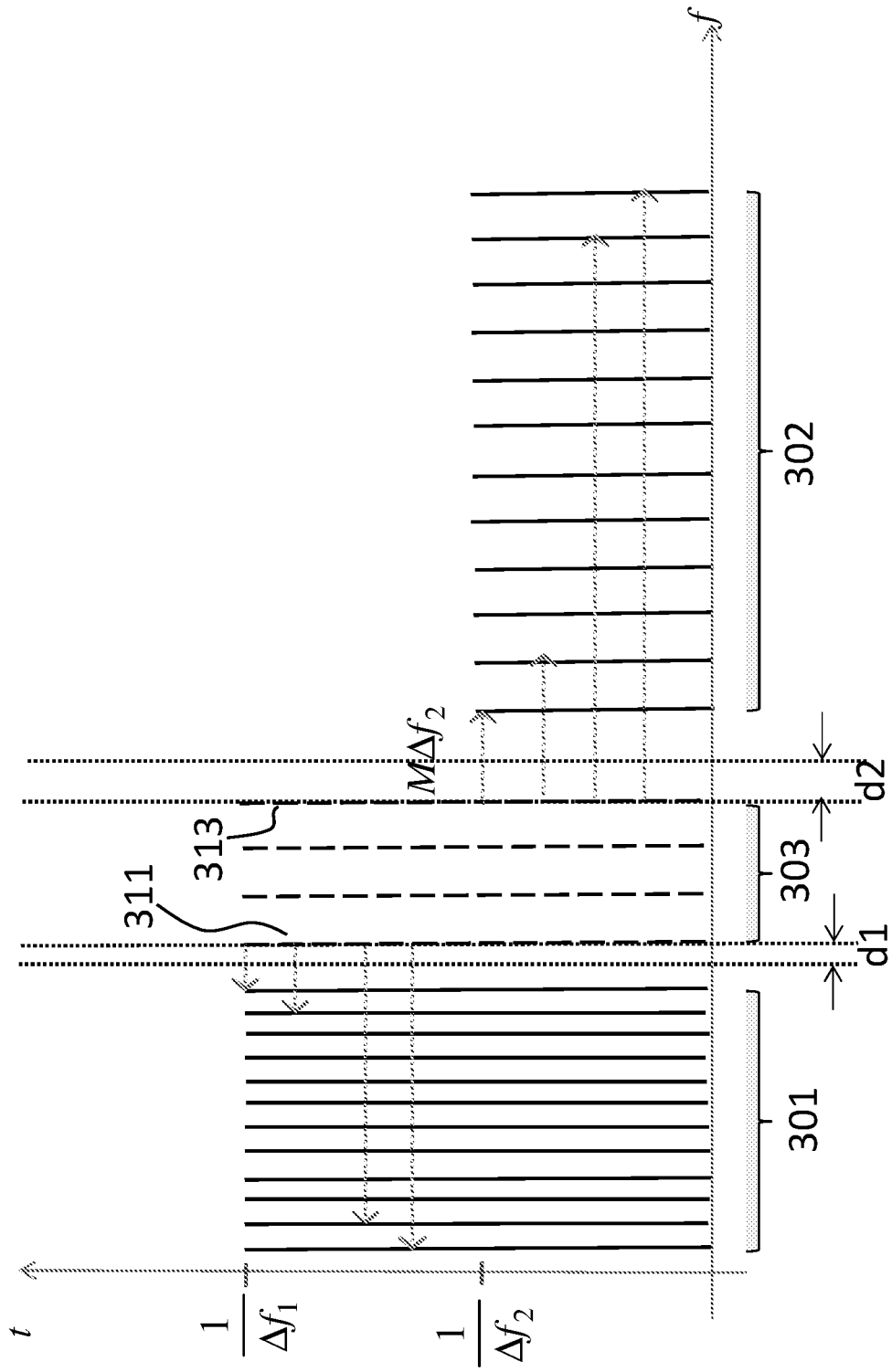
FIG. 3 illustrates another example of transmission bands in accordance with the present technology.

FIG. 3 illustrates another example of transmission bands in accordance with the present technology. In FIG. 3, a special transmission band Band3 (303) is located between two adjacent bands (or sub-bands) Band1 (301) and Band2 (302). Band1 and Band2 have different numerologies. The subcarrier spacing of Band1 is $\Delta f_1$ and the symbol length of Band1 is $1/\Delta f_1$. The subcarrier spacing of Band2 is $\Delta f_2$ and the symbol length of Band2 is $1/\Delta f_2$. In some embodiments, $\Delta f_2 = N\Delta f_1$ is satisfied, and N is a positive integer. In some embodiments, $N>1$.

The subcarrier spacing of Band3 (303) is $\Delta f_2$ (same as the subcarrier spacing of Band2) while the symbol length of Band3 is $1/\Delta f_1$, same as the symbol length of Band1. Here, the symbol lengths of Band1 and Band3 are both the effective symbol lengths of each respective band without CP. In this embodiment, Band3 does not occupy the entire spectrum between Band1 and Band2. A small guard band (d1, d2) is positioned at each end of the spectrum. The distance between the leftmost subcarrier 311 of Band3 and the subcarriers of Band1 (from right to left) is $d1 + L\Delta f_1$, where L is a positive integer. The distance between the rightmost subcarrier 313 of Band3 and the subcarriers of Band2 (from left to right) is $d2 + M\Delta f_2$, where M is a positive integer.

Similar to Embodiment 1, setting the subcarrier spacing of Band3 to $\Delta f_2$ provides the advantage that subcarriers of Band3 and subcarriers of Band2 can remain orthogonal to each other. Setting the symbol length of Band3 to the symbol length of Band1 allows subcarriers of Band3 and subcarriers of Band1 to remain orthogonal to each other. Even when the symbol length includes CP, the interference caused by non-orthogonality of the subcarriers remains low. The additional small guard bands d1 and d2 can help reduce interference without introducing a big waste of frequency resources. In some embodiments, $d1=0$ and $d2>0$, and d2 is an integer multiple of $\Delta f_2$. When the symbol length includes CP, such configuration of small guard bands can reduce the low interference between Band3 and Band2.

For example, as shown in FIG. 3, Band1 (301) can have 12 subcarriers in a resource block (RB). The subcarrier spacing of Band1 $\Delta f_1$ is 15 kHz. The symbol length of Band1 is $1/\Delta f_1 = 1/15$ kHz. Band2 (302) also has 12 subcarriers in an RB. The subcarrier spacing of Band2 $\Delta f_2 = 2\Delta f_1 = 30$ kHz (that is, $N=2$). The special transmission Band3 (303) has 4 subcarriers. It is noted, however, that the transmission bands (e.g., Band1, Band2, and/or Band3) can include more subcarriers and/or multiple RBs. The special transmission band is configured so that its subcarrier spacing is $\Delta f_2 = 30$ kHz and the symbol length is $1/\Delta f_1 = 1/15$ kHz.

In this specific example, the distance between the leftmost subcarrier of Band3 and the subcarriers of Band1 (from right to left) is $d1 + L\Delta f_1$, where $L=1, 2, \ldots, 12$. The distance between the rightmost subcarrier of Band3 and the subcarriers of Band2 (from left to right) is $d2 + M\Delta f_2$, where $M=1, 2, \ldots, 12$.

Embodiment 3

Figure 4:
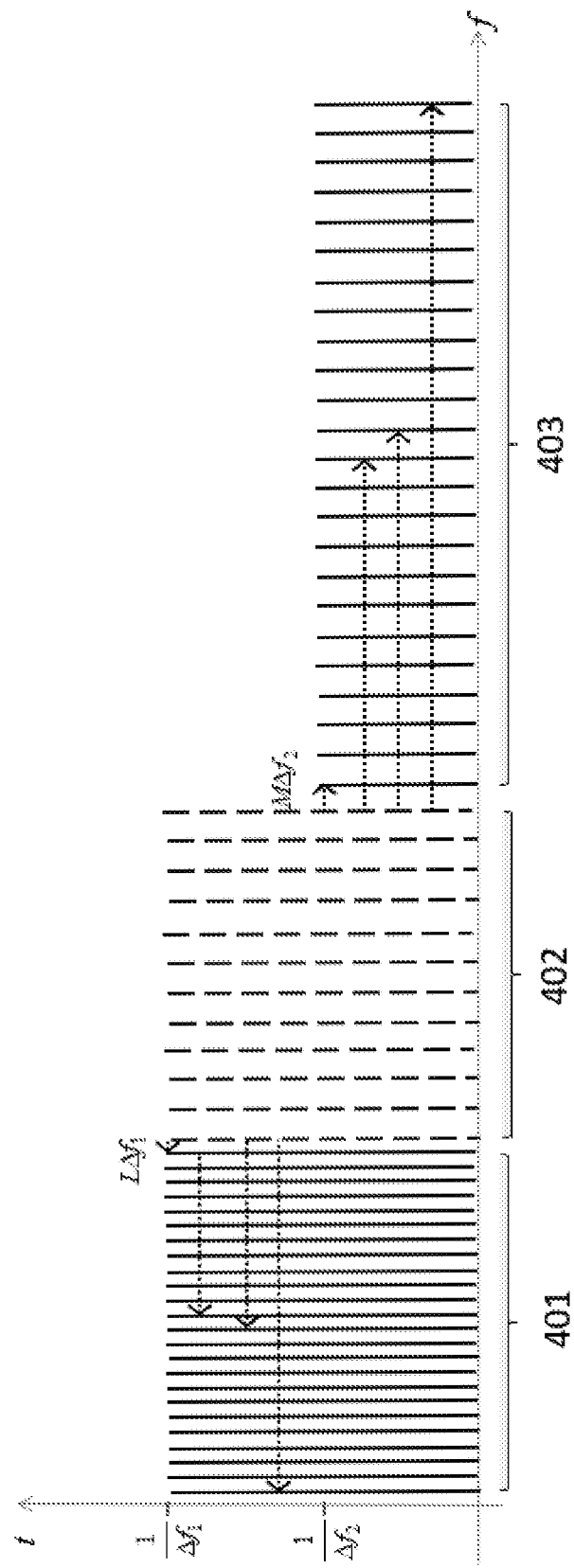
FIG. 4 illustrates another example of transmission bands in accordance with the present technology.

FIG. 4 illustrates another example of transmission bands in accordance with the present technology. In this specific example, Band1 (401) has 24 subcarriers in two RBs. The subcarrier spacing of Band1 $\Delta f_1$ is 15 kHz. The symbol length of Band1 is $1/\Delta f_1 = 1/15$ kHz. Band2 (402) also has 24 subcarriers in two RBs. The subcarrier spacing of Band2 $\Delta f_2 = 2\Delta f_1 = 30$ kHz (that is, $N=2$). The special transmission band Band3 (403) has 12 subcarriers. It is noted, however, that the transmission bands (e.g., Band1, Band2, and/or Band3) can include fewer or more subcarriers and/or RBs. The special transmission band is configured so that its subcarrier spacing is $\Delta f_2 = 30$ kHz and the symbol length is $1/\Delta f_1 = 1/15$ kHz.

Band3 (403) occupies the entire spectrum between Band1 (401) and Band2 (402). The distance between the leftmost subcarrier of Band3 and the subcarriers of Band1 (from right to left) is $L\Delta f_1$, where $L=1, 2, \ldots, 24$. The distance between the rightmost subcarrier of Band3 and the subcarriers of Band2 (from left to right) is $M\Delta f_2$, where $M=1, 2, \ldots, 24$.

Embodiment 4

Figure 5:
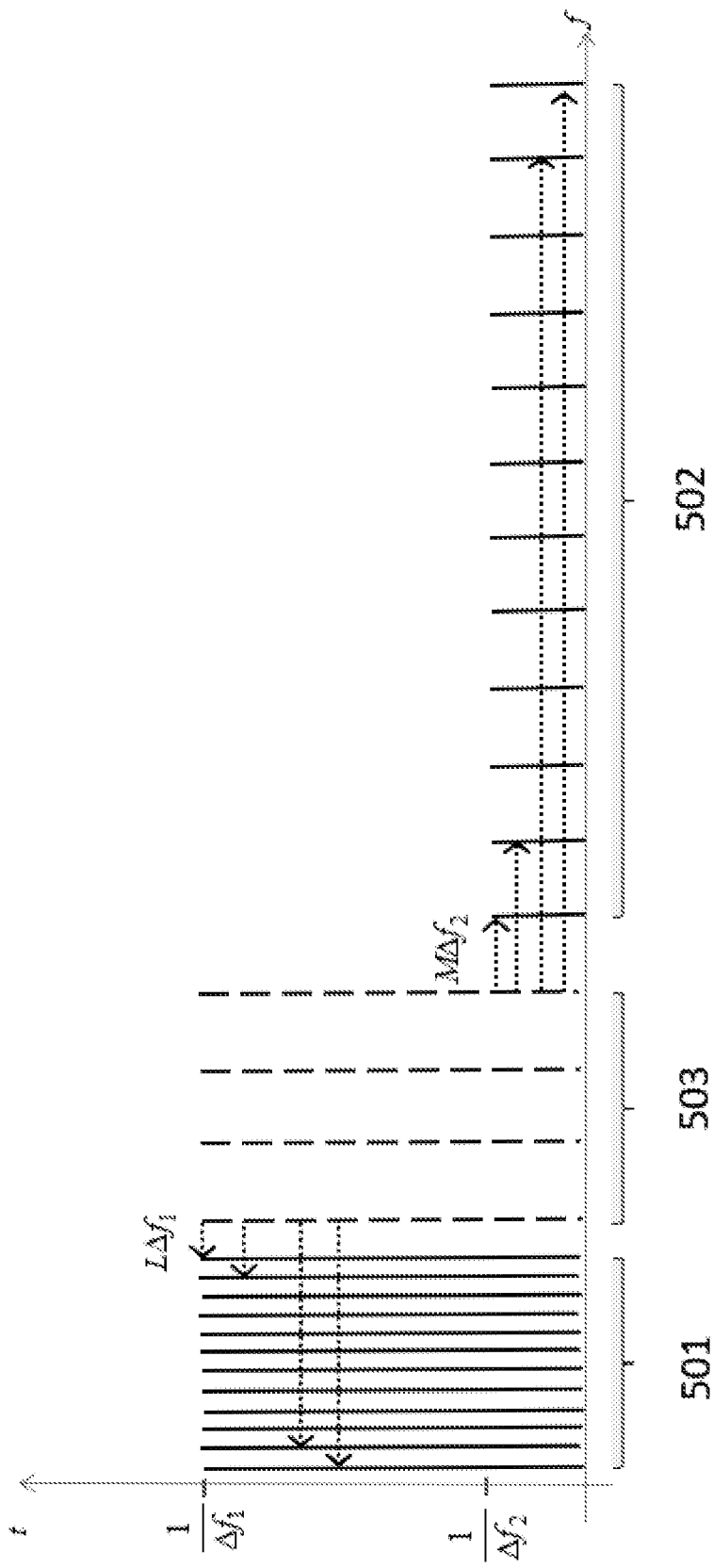
FIG. 5 illustrates another example of transmission bands in accordance with the present technology.

FIG. 5 illustrates another example of transmission bands in accordance with the present technology. In this specific example, Band1 (501) has 12 subcarriers in an RB. The subcarrier spacing of Band1 $\Delta f_1$ is 15 kHz. The symbol length of Band1 is $1/\Delta f_1 = 1/15$ kHz. Band2 (502) also has 12 subcarriers in an RB. The subcarrier spacing of Band2 $\Delta f_2 = 4\Delta f_1 = 60$ kHz (that is, $N=4$). The special transmission band Band3 (503) has 4 subcarriers. It is noted that the transmission bands (e.g., Band1, Band2, and/or Band3) can include fewer or more subcarriers and/or RBs. The special transmission band is configured so that its subcarrier spacing is $\Delta f_2 = 60$ kHz and the symbol length is $1/\Delta f_1 = 1/15$ kHz.

Band3 (503) occupies the entire spectrum between Band1 (501) and Band2 (502). The distance between the leftmost subcarrier of Band3 and the subcarriers of Band1 (from right to left) is $L\Delta f_1$, where $L=1, 2, \ldots, 12$. The distance between the rightmost subcarrier of Band3 and the subcarriers of Band2 (from left to right) is $M\Delta f_2$, where $M=1, 2, \ldots, 12$.

Embodiment 5

Figure 6:
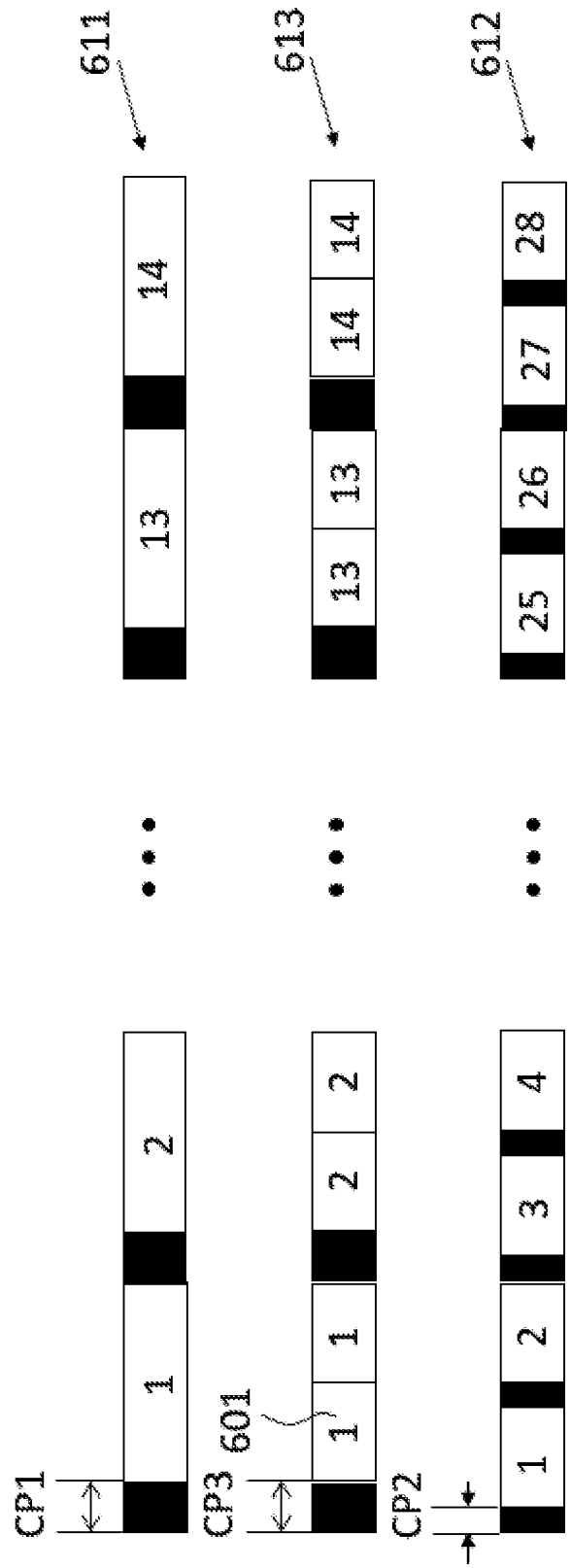
FIG. 6 illustrates an example of time-domain symbols of transmission bands in accordance with the present technology.

FIG. 6 illustrates an example of time-domain symbols of transmission bands in accordance with the present technology. The subcarrier spacing of the transmission Band1 (611) is $\Delta f_1$. The subcarrier spacing of the transmission Band2 (612) is $\Delta f_2$. $\Delta f_2 = N\Delta f_1$, where N is a positive integer. In some embodiments, $N>1$. The subcarrier spacing of the special transmission Band3 (613) is $\Delta f_2$ (same as the subcarrier spacing of Band2). Here, the symbol length refers to the symbol interval, which is the time-domain spacing between start positions of two adjacent symbols that includes CP.

There are N duplicated copies of the time domain data within the effective symbol length of Band3. The time domain data 601 with a length of $1/\Delta f_2$ is repeated $N-1$ times. That is, $N/\Delta f_2 = 1/\Delta f_1$.

For example, subcarrier spacing of Band1 is $\Delta f_1 = 15$ kHz. The effective length of each symbol is $1/\Delta f_1 = 1/15$ kHz. FIG. 6 illustrates 14 symbols of Band1 (611), each symbol being preceded by a cyclic prefix CP1. The subcarrier spacing of Band2 is $\Delta f_2 = N\Delta f_1 = 30$ kHz, where $N=2$. FIG. 6 illustrates 28 symbols of Band2 (612), each symbol being preceded by a cyclic prefix CP2. The subcarrier spacing of Band3 is $\Delta f_2 = 30$ kHz. FIG. 6 illustrates 14 symbols of Band3 (613), each is repeated once (that is, $N=2$). The effective symbol length of Band3 is $1/\Delta f1=1/15$ kHz, and each symbol is preceded by a cyclic prefix CP3 that has the same length as CP1.

Figure 7:
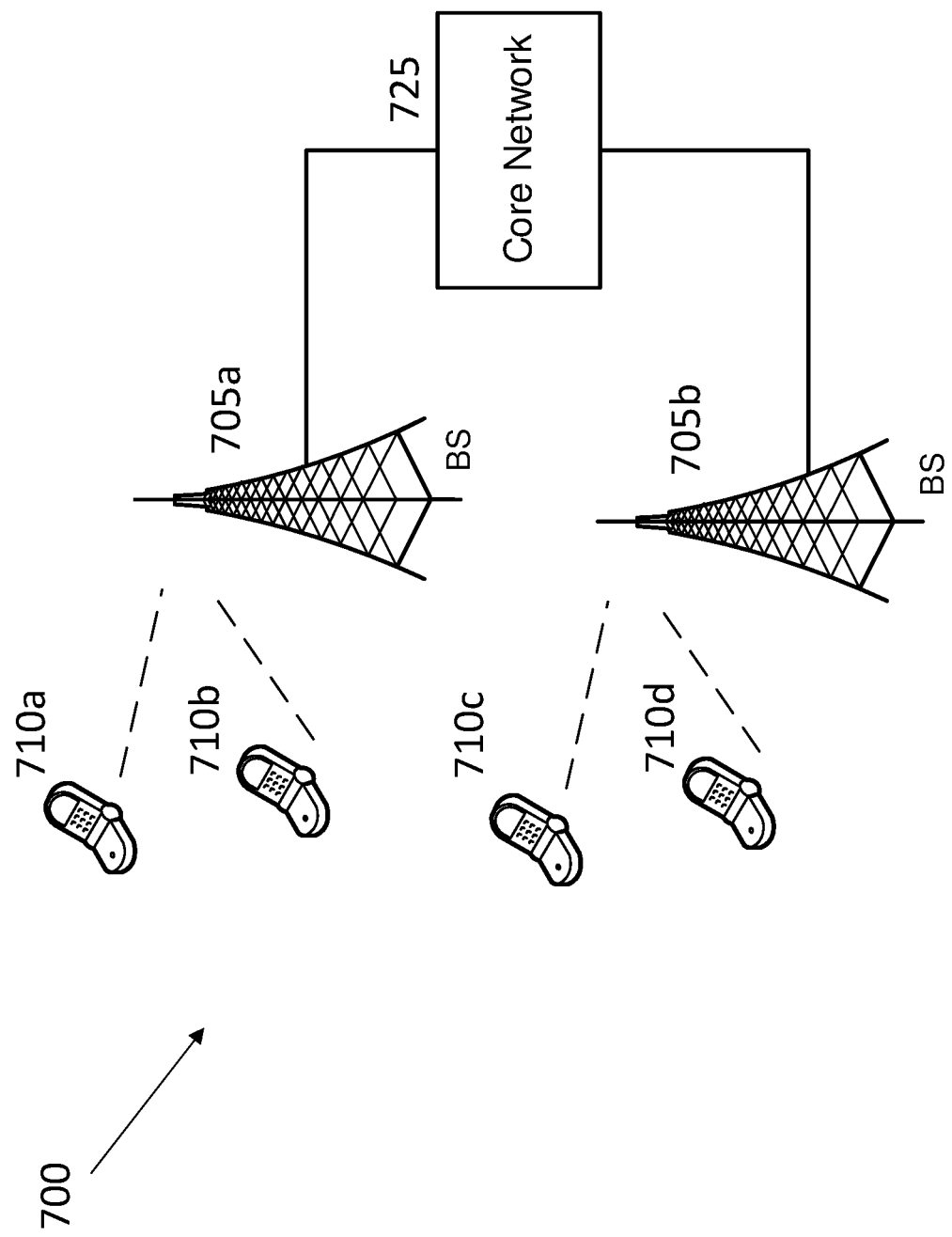
FIG. 7 shows an example of a wireless communication system where techniques in accordance with one or more embodiments of the present technology can be applied.

FIG. 7 shows an example of a wireless communication system 700 where techniques in accordance with one or more embodiments of the present technology can be applied. A wireless communication system 700 can include one or more base stations (BSs) 705a, 705b, one or more wireless devices 710a, 710b, 710c, 710d, and a core network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies. The techniques and embodiments described in the present document may be implemented by the base stations of wireless devices described in the present document.

Figure 8:
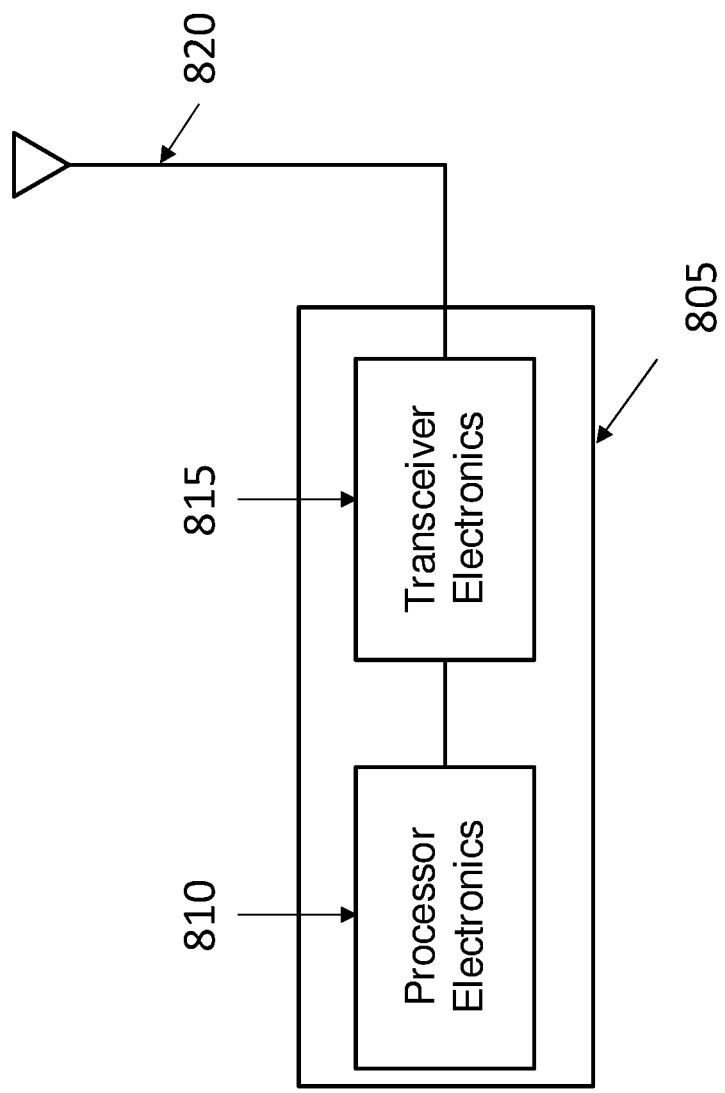
FIG. 8 is a block diagram representation of a portion of a radio station in accordance with one or more embodiments of the present technology can be applied.

FIG. 8 is a block diagram representation of a portion of a radio station in accordance with one or more embodiments of the present technology can be applied. A radio station 805 such as a base station or a wireless device (or UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805. In some embodiments, the radio station 805 may be configured to perform the methods described herein. For example, the transceiver electronics 815 may be configured to operate in the first, second and third transmission bands as described with respect to FIG. 1.

It will be appreciated that the present document discloses techniques that can be embodied in various embodiments to increase spectral efficiency by transmitting data in a special transmission band/sub-stand between two adjacent transmission bands/sub-bands with different numerologies. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
   operating, by a communication device, a first transmission band associated with a first numerology, the first transmission band comprising a first subcarrier spacing $\Delta f1$ and a first symbol length of $T_1$ in time domain;
   operating, by the communication device, a second transmission band associated with a second numerology, the second transmission band comprising a second subcarrier spacing $\Delta f2$, wherein $\Delta f2=N\times\Delta f1$, N being a positive integer greater than 1; and
   operating, by the communication device, a third transmission band positioned between the first transmission band and the second transmission band, the third transmission band comprising a subcarrier spacing equal to the second subcarrier spacing $\Delta f2$ and a symbol length equal to the first symbol length $T_1$.

2. The method of claim 1, wherein the operating the first transmission band, the operating the second transmission band, and the operating the third transmission band are performed simultaneously.

3. The method of claim 1,
   wherein the symbol length includes a cyclic prefix having a length,
   wherein $T1=1/\Delta f1+Tcp$, and
   wherein Tcp is the length of the cyclic prefix.

4. The method of claim 1, wherein the symbol length of the third transmission band includes N duplicated data sequences.

5. The method of claim 1, wherein an interval between a boundary subcarrier of the third transmission band and a subcarrier of the first transmission band is $L\times\Delta f1$, L being positive integers.

6. The method of claim 1, wherein an interval between a boundary subcarrier of the third transmission band and a subcarrier of the second transmission band is $M\times\Delta f2$, M being positive integers.

7. The method of claim 1, wherein the first transmission band is associated with a first modulation and coding scheme, the second transmission band is associated with a second modulation and coding scheme, and third transmission band is associated with a third modulation and coding scheme;
   wherein the first or second modulation and coding schemes are selected from a first set of modulation and coding schemes, and the third modulation and coding scheme is selected from a second set of modulation and coding schemes; and
   wherein a largest modulation order in the second set of modulation and coding schemes is equal to or smaller than a largest modulation order in the first set of modulation and coding schemes.

8. The method of claim 1, wherein a modulation order of the first transmission band is equal to or greater than a modulation order of the third transmission band.

9. The method of claim 1, wherein a modulation order of the second transmission band is equal to or greater than a modulation order of the third transmission band.

10. The method of claim 1, wherein the first transmission band, the second transmission band, and the third transmission band are sub-bands of a channel bandwidth.

11. A communication device, comprising:
    a processor configured to implement a method, the processor configured to cause the communication device to:
    operate a first transmission band associated with a first numerology, the first transmission band comprising a first subcarrier spacing $\Delta f1$ and a first symbol length of $T_1$ in time domain;
    operate a second transmission band associated with a second numerology, the second transmission band comprising a second subcarrier spacing $\Delta f2$, wherein $\Delta f2=N\times\Delta f1$, N being a positive integer greater than 1; and
    operate a third transmission band positioned between the first transmission band and the second transmission band, the third transmission band comprising a subcarrier spacing equal to the second subcarrier spacing $\Delta f2$ and a symbol length equal to the first symbol length $T_1$.

12. The communication device of claim 11, wherein the processor is configured to simultaneously perform the operate the first transmission band, the operate the second transmission band, and the operate the third transmission band.

13. The communication device of claim 11,
    wherein the symbol length includes a cyclic prefix having a length,
    wherein $T1=1/\Delta f1+Tcp$, and
    wherein Tcp is the length of the cyclic prefix.

14. The communication device of claim 11, wherein the symbol length of the third transmission band includes N duplicated data sequences.

15. The communication device of claim 11, wherein an interval between a boundary subcarrier of the third transmission band and a subcarrier of the first transmission band is $L\times\Delta f1$, L being positive integers.

16. The communication device of claim 11, wherein an interval between a boundary subcarrier of the third transmission band and a subcarrier of the second transmission band is $M\times\Delta f2$, M being positive integers.

17. The communication device of claim 11, wherein the first transmission band is associated with a first modulation and coding scheme, the second transmission band is associated with a second modulation and coding scheme, and third transmission band is associated with a third modulation and coding scheme;

wherein the processor is configured to select the first or second modulation and coding schemes from a first set of modulation and coding schemes, and the processor is configured to select the third modulation and coding scheme from a second set of modulation and coding schemes; and wherein a largest modulation order in the second set of modulation and coding schemes is equal to or smaller than a largest modulation order in the first set of modulation and coding schemes.

18. The communication device of claim 11, wherein a modulation order of the first transmission band is equal to or greater than a modulation order of the third transmission band.

19. The communication device of claim 11, wherein a modulation order of the second transmission band is equal to or greater than a modulation order of the third transmission band.

20. The communication device of claim 11, wherein the first transmission band, the second transmission band, and the third transmission band are sub-bands of a channel bandwidth.

\* \* \* \* \*